March 1, 1932.    R. L. DEZENDORF    1,847,524
GAS METER
Filed Sept. 30, 1927    2 Sheets-Sheet 1
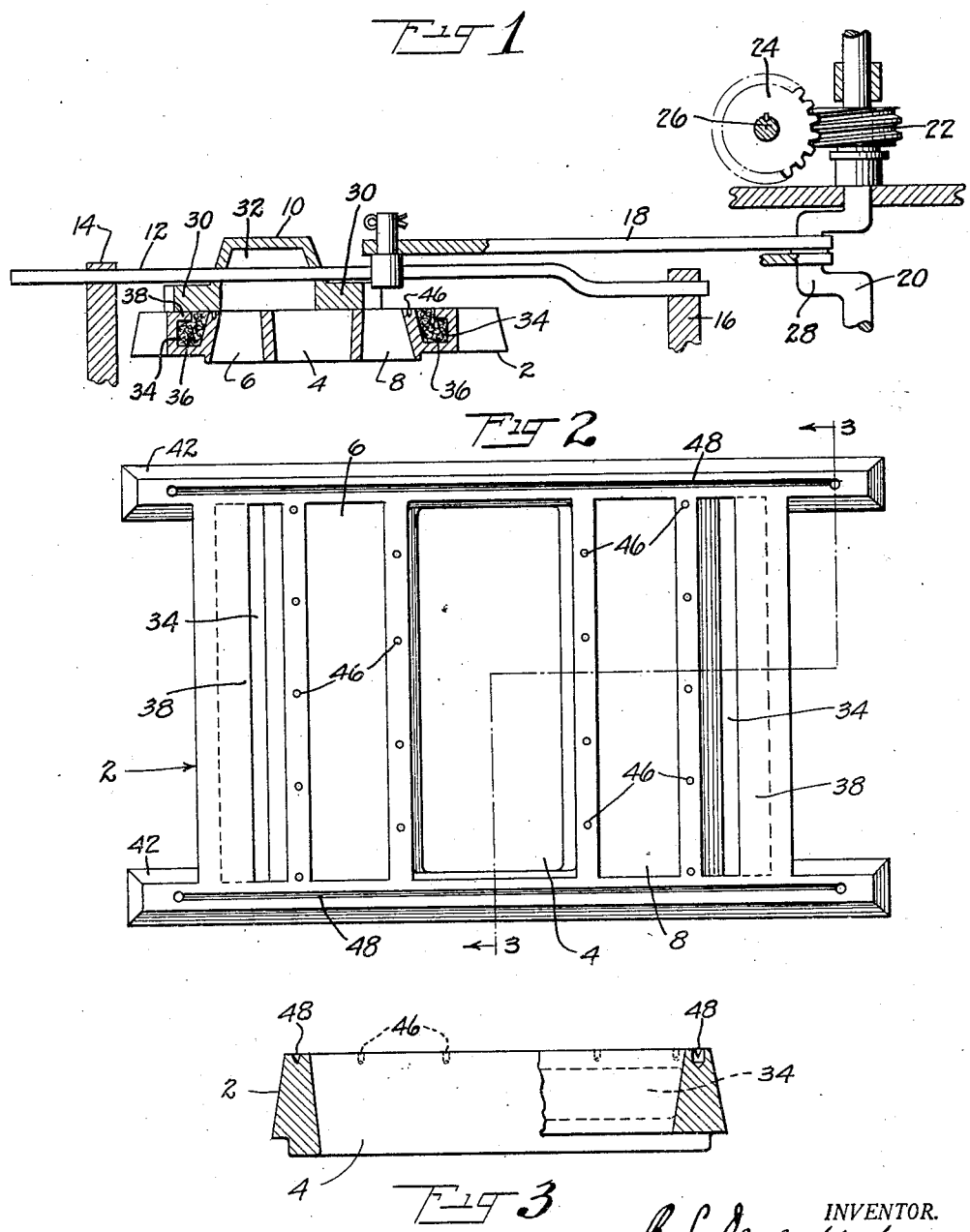

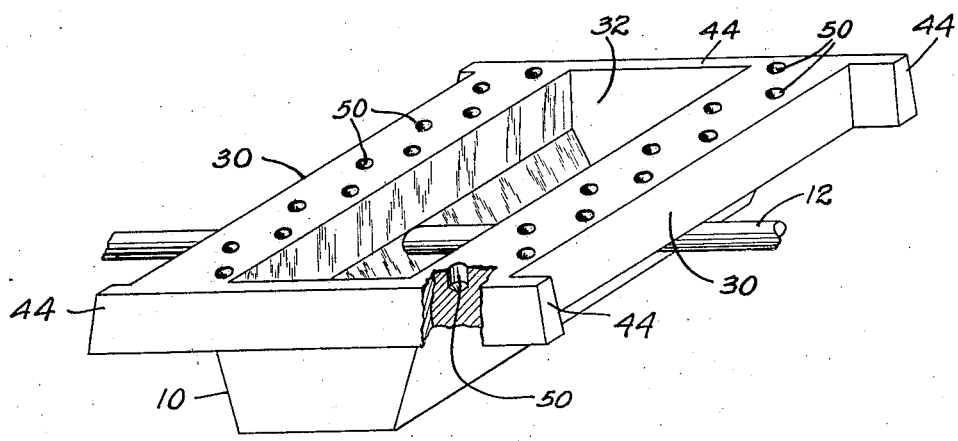
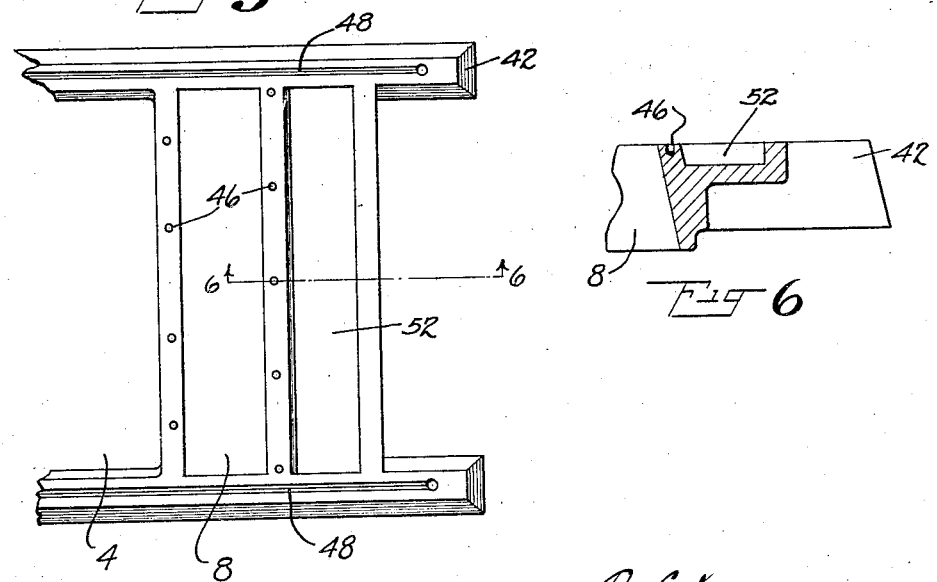

Patented Mar. 1, 1932

1,847,524

UNITED STATES PATENT OFFICE

RICHARD L. DEZENDORF, OF HOLLIS, NEW YORK

GAS METER

Application filed September 30, 1927. Serial No. 223,009.

My invention relates to improvements in gas meters and constitutes an improvement upon the construction shown in my Patent No. 1,490,495, dated April 15, 1924.

One object of my invention is to produce a new and improved lubricated valve for gas meters which will reduce the present errors in registration of gas consumed. Another object of my invention is to provide a lubricated valve for gas meters in which the lubricant is conserved and the valve will have sufficient lubrication so as not to require attention for a long period of time. Another object of my invention is to prevent or lessen the accumulation upon the valve faces of residue, which tends to lift the sliding valve member from its seat.

I have found that the errors in registration of gas consumed, due to leaking valves in gas meters, result, in the aggregate, to a considerable amount and that by properly lubricating the valve this leakage can be largely prevented. In my valve the prevention is secured by keeping the surfaces properly lubricated and thereby reducing the accumulation of gummy matter deposited on the contacting faces of the members and by conserving the lubricant.

The following is a description of an embodiment of my invention, reference being had to the accompanying drawings, in which:

Figure 1 shows in longitudinal section one of the two similar valves of a gas meter embodying my invention in connection with the operating crank shaft ordinarily used in gas meters;

Fig. 2 is an enlarged plan view of the valve seat;

Fig. 3 is a section of the valve seat on the line 3—3, Fig. 2;

Fig. 4 is a perspective view of the sliding member of the valve;

Fig. 5 shows a partial plan view of a modification of the valve seat; and Fig. 6 shows a section of the same on the line 6—6, Fig. 5.

Referring more particularly to the drawings, 2 is a valve seat to be mounted in the valve chamber of a gas meter in the ordinary manner, the same having an outlet port 4 to be connected to the outlet of the meter and inlet ports 6 and 8 to be connected to the main chamber of the meter on the inside and outside of the diaphragm, respectively. Mounted upon this valve seat is a valve slide 10 provided with a guide-rod 12 sliding through suitable guides 14 and 16 in the ordinary manner and actuated through a link 18 by the ordinary crank-shaft 20, which carries the usual worm 22 meshing with the usual pinion 24 upon the indicator shaft 26. The crank 28 of the crank-shaft, as shown in Fig. 1, is at its dead center relative to the slide 10, so that the slide 10 is at the limit of one of its movements of reciprocation. The slide member 10 has the usual wings 30 and chamber 32.

In order to properly lubricate the valve and to conserve the lubricant, I provide reservoirs 34 located just beyond the outer walls of the ports 6 and 8 and adapted to contain a proper lubricant such as peach kernel oil, castor oil or petroleum jelly. These reservoirs may contain a wicking 36 of fibrous material, which, by capillary attraction, assists in bringing the lubricant to the lower surface of the valve member 10 as it reciprocates. Where wicking is employed the reservoirs preferably have overhanging lips 38 forming re-entrant recesses adapted to hold the wicking in place.

When the sliding member is in its limiting positions, one of the wings 30 extends to the inner edge of the outer wall of one of the reservoirs 34 but not to the outer edge. The wings 30, as the member 10 moves close the ports 6 and 8 momentarily and later the chamber 32, connects the outlet port to one or the other of the inlet ports; this action being the usual valve action.

The valve seat has side members 42 projecting beyond the reservoirs 34, and the slide member 10 has side members 44 projecting beyond the wings 30, the proportions being such that when the sliding member 10 is in its limiting position the portions 42 of the seat extend beyond the portions 44 of the sliding member, so that the under sides of the projections 44 are always in contact with a lubricated surface, thus reducing the liability of having the gummy residue deposited by the gas accumulating and lifting the sliding member from the seat.

The outer walls of the reservoirs 34 are so disposed that the lower face of each forward wing 30 is substantially covered by the reservoirs when the sliding members 10 are in their limiting positions, and portions of the outer walls of the reservoirs are always beyond the forward extremity of each wing 30 which results in conserving the lubricant since the moving member on that account does not push the lubricant beyond that portion. By my construction the lower faces of the sliding member are more continuously in contact with a lubricated surface and the objectionable accumulation of gummy matter is lessened.

Preferably, the cross-bars of the valve seat are provided with recesses 46 and their side bars are provided with elongated recesses 48 which catch and hold some of the lubricating material delivered from the reservoirs.

The lower faces of the wings 30, as shown in Fig. 4, are provided with two offset series of recesses 50 which also collect some of the lubricating material delivered from the reservoirs.

In the form shown in Fig. 6, the reservoirs for the lubricant are made shallower, as indicated at 52, and the wicking omitted, some of the lubricant rising along the walls of the reservoir and being fed to the contacting surfaces without such wicking. These reservoirs, however, cover the lower faces of the wings so as to provide more continuous contact of lubricating surfaces and provide lubricant supports beyond the edge portion of the wings when at the ends of their movements.

The valve seat and valve, as above described, are mounted in the ordinary manner and a suitable amount of lubricant is placed in the reservoirs and preferably the recesses in the contacting faces of the valve seat and sliding member are filled with lubricant. As the lubricant in the recesses is used up, it is more or less replenished by lubricant from the reservoirs, which in operation is automatically spread upon the contacting faces and to some extent collected by the recesses.

The valves as thus constructed remain lubricated for long periods of time so that no replenishment is necessary practically speaking, except when in the ordinary course of events the meters are returned to the meter shop for inspection.

In operation, the lubricant itself tends to prevent the accumulation on the valve faces of the gummy residue from the gas and the more continuous contact of the surfaces of the sliding member 10 with a lubricated surface also acts to reduce objectionable accumulation of such gummy residue thereon, and, furthermore, the extremities of the wings 30, as they approach the limits of their movement, do not push lubricant beyond the valve seat.

Valves embodying my invention have been found to reduce gas leakage to a substantial extent so as to in the aggregate result in a material saving.

As will be evident to those skilled in the art, my invention permits various modifications without departing from the spirit thereof or the scope of the appended claims.

What I claim is:

1. In a gas meter, the combination of a valve seat having an outlet port and two inlet ports, a winged valve member sliding thereon, and means for reciprocating said member, said valve seat having lubricant reservoirs situated outwardly from the inlet ports and substantially covering the wings of the sliding member when it is at the ends of its movements respectively.

2. In a gas meter, the combination of a valve seat having an outlet port and two inlet ports, a winged valve member sliding thereon, and means for reciprocating said member, said valve seat having lubricant reservoirs situated outwardly from the inlet ports and having walls extending beyond the outer edge portions of the winged member when it is at the ends of its movements.

3. In a gas meter, the combination of a valve seat having an outlet port and two inlet ports, a winged valve member sliding thereon, and means for reciprocating said member, said valve seat having lubricant reservoirs situated outwardly from the inlet ports, and fibrous material within said reservoirs contacting with said sliding valve member and acting to apply lubricant to the under surface of the winged valve member.

4. In a gas meter, the combination of a valve seat having an outlet port and two inlet ports, a winged valve member sliding thereon, and means for reciprocating said member, said valve seat having lubricant reservoirs situated outwardly from the inlet ports and substantially covering the wings of the sliding member when the sliding member is at the ends of its movements, respectively, said valve seat and sliding member having extending side portions, each side portion of the sliding member being always in contact throughout its length with the side portions of the valve seat.

5. In a gas meter, the combination of a valve seat having an outlet port and two inlet ports, a winged valve member sliding thereon, and means for reciprocating said member, said valve seat having lubricant reservoirs situated outwardly from the inlet ports and substantially covering the wings of the sliding member when it is at the ends of its movements, and the faces of said valve seat having recesses opposed to the sliding member collecting lubricant supplied from said reservoirs.

6. In a gas meter, the combination of a valve seat having an outlet port and two inlet ports, a winged valve member sliding thereon, and means for reciprocating said member, said valve seat having lubricant reservoirs situated outwardly from the inlet ports and substantially covering the wings of the sliding member when it is at the end of its movement, and the face of said sliding member having recesses adapted to collect lubricant supplied from said reservoirs, said recesses in said sliding member comprising two offset series located in each of its wings.

7. In a gas meter, the combination of a valve seat having an outlet port and two inlet ports, a winged valve member sliding thereon, means for reciprocating said member, said valve seat having lubricant reservoirs situated outwardly from the inlet ports, and fibrous material within said reservoirs contacting with said sliding valve member and acting to apply lubricant to the under surface of the winged valve member, said reservoirs having lips overhanging portions of said fibrous material.

In testimony whereof, I have signed my name to this specification this 20th day of September, 1927.

RICHARD L. DEZENDORF.